(12) United States Patent
McGrew

(10) Patent No.: US 9,709,829 B2
(45) Date of Patent: Jul. 18, 2017

(54) BEAM STEERING DEVICE

(71) Applicant: Vuzix Corporation, Rochester, NY (US)

(72) Inventor: Stephen Paul McGrew, Spokane, WA (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 13/680,036

(22) Filed: Nov. 17, 2012

(65) Prior Publication Data

US 2013/0128334 A1 May 23, 2013

Related U.S. Application Data

(60) Provisional application No. 61/561,579, filed on Nov. 18, 2011.

(51) Int. Cl.
| | |
|---|---|
| *G02F 1/01* | (2006.01) |
| *G02B 3/08* | (2006.01) |
| *G02B 21/14* | (2006.01) |
| *G02B 26/06* | (2006.01) |
| *G02B 27/50* | (2006.01) |
| *G02B 5/18* | (2006.01) |
| *G02B 26/08* | (2006.01) |
| *G02F 1/29* | (2006.01) |

(52) U.S. Cl.
CPC .............. *G02F 1/01* (2013.01); *G02B 3/08* (2013.01); *G02B 5/189* (2013.01); *G02B 5/1828* (2013.01); *G02B 21/14* (2013.01); *G02B 26/06* (2013.01); *G02B 26/0808* (2013.01); *G02B 27/50* (2013.01); *G02F 1/29* (2013.01); *G02F 2001/294* (2013.01); *G02F 2203/18* (2013.01); *G02F 2203/50* (2013.01)

(58) Field of Classification Search
CPC .... G02B 21/14; G02B 26/06; G02B 26/0808; G02B 27/50; G02B 3/08; G02B 5/1828; G02B 5/189; G02F 1/01; G02F 2203/18; G02F 2203/50
USPC ........................................................ 359/279
See application file for complete search history.

(56) References Cited

U.S. PATENT DOCUMENTS

| | | | |
|---|---|---|---|
| 4,937,539 A | 6/1990 | Grinberg et al. | |
| 5,648,859 A * | 7/1997 | Hirabayashi | G02B 27/283 349/196 |

(Continued)

OTHER PUBLICATIONS

Golovin et al.: Gradient Beam Steering Device Based on Nematic Cell With Continuous Ramp of the Phase Retardation (SPIE vol. 5741; pp. 146-153; 2005).

(Continued)

*Primary Examiner* — Scott J Sugarman
*Assistant Examiner* — Vipin Patel
(74) *Attorney, Agent, or Firm* — Thomas B. Ryan, Patent Agent; Harter Secrest & Emery LLP

(57) ABSTRACT

An electrically variable lens comprising a variable Fresnel lens and a variable phase corrector plate. A liquid crystal variable Fresnel lens and liquid crystal phase corrector plate are varied in concert to compensate for wavefront discontinuities that would otherwise be produced by the Fresnel lens. The same principle is also used to provide a device capable of imposing an arbitrary spatial and temporal phase modulation on a wavefront.

23 Claims, 15 Drawing Sheets

(56) References Cited

U.S. PATENT DOCUMENTS

| | | | |
|---|---|---|---|
| 5,920,664 A * | 7/1999 | Hirabayashi | G02B 6/43 |
| | | | 349/196 |
| 5,973,727 A | 10/1999 | McGrew et al. | |
| 5,990,992 A * | 11/1999 | Hamanaka | G02B 3/0031 |
| | | | 349/158 |
| 6,181,367 B1 | 1/2001 | McGrew et al. | |
| 6,421,105 B1 * | 7/2002 | Shieh | G02F 1/133526 |
| | | | 349/95 |
| 6,469,683 B1 * | 10/2002 | Suyama et al. | 345/32 |
| 7,710,536 B2 * | 5/2010 | Osawa et al. | 349/202 |
| 8,014,050 B2 | 9/2011 | McGrew | |
| 2004/0108984 A1 * | 6/2004 | Ogasawara | 345/87 |
| 2005/0078237 A1 * | 4/2005 | Klaus | G02F 1/13306 |
| | | | 349/98 |
| 2006/0209219 A1 * | 9/2006 | Koide | G03B 21/14 |
| | | | 349/5 |
| 2010/0171935 A1 * | 7/2010 | Yamagishi et al. | 353/52 |
| 2011/0043717 A1 | 2/2011 | Valyukh et al. | |

OTHER PUBLICATIONS

Zhu, Tom Y.: Irregular Virtual Optical Phased-Array (SPIE vol. 3951; pp. 61-72; 2000).
Tholl, Hans Dieter: Novel Laser Beam Steering Techniques (SPIE vol. 6397; pp. 639708-1-639708-14; 2006).
Wang et al.: Liquid-crystal blazed-grating beam deflector (Applied Optics, vol. 39, No. 35; pp. 6545-6555; Dec. 2000).
Valyukh et al.: A Liquid Crystal Lens With Non-uniform Anchoring Energy (SID 08 Digest; pp. 659-662; 2008).
Titus et al.: Efficient, Accurate Liquid Crystal Digital Light Deflector ) Proc. SPIE, 3633, 244, (1999). Proc. SPIE 3633, Diffractive and Holographic Technologies, Systems, and Spatial Light Modulators VI, 244 (Jun. 1, 1999); doi:10.1117/12.349334.

* cited by examiner

BEAM STEERING DEVICE

RELATED APPLICATIONS

This application claims the benefit of U.S. Provisional Application No. 61/561,579, filed Nov. 18, 2011, which provisional application is hereby incorporated by reference.

BACKGROUND OF THE INVENTION

A conventional Fresnel lens is like an "accordioned" lens. It comprises annular zones, each zone approximating a slice from a parabolic or spherical surface. A cross section of a Fresnel lens typically looks like a sawtooth pattern, with each sawtooth segment starting at a base height and rising to a peak height, with the base and peak heights being approximately the same for all segments. The radial width of each segment in the lens varies, however, to accommodate the fact that the slope of the slanted face of each sawtooth segment is smaller near the center of the lens and greater near the edge of the lens.

FIG. 1 illustrates the cross section and function of a typical Fresnel lens 100. The typical Fresnel lens 100 can be highly efficient, but unless the peak height of each zone corresponds to a phase delay of precisely one wavelength (plus the phase delay gradient that reforms the incident wavefront into the desired outgoing wavefront), it is not possible for the lens 100 to direct all transmitted light to a single focus 101 because the wavefronts 103 formed by the different zones do not have exactly the correct phase relationship at every point across the lens 100 to form a desired spatially coherent wavefront 102 that converges to the single focus 101.

A conventional Fresnel zone plate 200, such as depicted in FIG. 2, is a diffractive lens formed from annular phase delay zones, each of which has a uniform phase profile. Typically the relative phase delay between adjacent zones is one wavelength (for the design wavelength of the zone plate) plus the requisite phase delay change between adjacent zones. The conventional Fresnel zone plate 200 has reduced efficiency because its output is split into multiple diffractive orders. FIG. 2 illustrates the cross section and operation of a Fresnel zone plate 200 with multiple orders focusing incoming light 204 into multiple foci 201 and 202.

A conventional blazed Fresnel zone plate 300, as illustrated in FIG. 3, combines aspects of both a Fresnel zone plate and a Fresnel lens. Every annular region in a blazed Fresnel zone plate has a phase delay that varies from zero to one wavelength, in such a way that the wavefronts 302 from adjacent zones are coherently joined edge-to-edge for converging to a common focus 301.

A disadvantage of both blazed and unblazed Fresnel zone plates is that they are fixed focal length elements, designed for focusing light of only a specific wavelength. It is desirable to have a variable focal length lens capable of being adjusted to function correctly with any selected wavelength of light.

Holographic polymer-dispersed liquid crystal devices have been demonstrated in which applying an electric field across a holographically formed active layer can switch the device between a diffractive state and a non-diffractive state.

SUMMARY OF THE INVENTION

The invention in a preferred respect involves using one set of variable elements to control the direction of portions of a wavefront, which we will refer to as the variable waveform component, and another set of variable elements to control the relative phase of adjacent portions the wavefront, which we will refer to as the phase compensation component. This general arrangement can be applied in the form a variable-focus lens or can be used to perform more general modulations of a wavefront. For example, variable-focus lenses and wavefront formers can be adjusted to function correctly with any selected wavelength of light.

The variable wavefront component and the phase compensation component can be stacked, used in parallel, imaged onto each other, or in any other combination that allows them both to work on the same wavefront. The desired in-phase wavefronts are produced through interactions with both components, independently of their exact configuration.

Without a phase compensation component, phase discontinuities would disrupt or otherwise limit the performance the variable wavefront component. In addition, the wavelength dependency of the variable wavefront component would vary with changes in focus. The phase compensation component provides for dynamically adjusting wavefront phases in such a way that there are no phase discontinuities at any focus or for any desired wavelength.

The phase compensation component can include individually addressable transmissive electrodes arranged, for example, as strips or rings. In the case of a variable wavefront component in the form of an embedded Fresnel structure, the electrodes can be spaced and sized in such a way to match each Fresnel zone, thereby providing phase compensation for the wavefront discontinuities between at each zone. In the other cases, the size and spacing of the electrodes can be uniform, with a width, such as on the order of 20-25 microns. In either case, a ground plane (or a plane at some other fixed voltage different from the electrode) can be positioned on the other side of the liquid crystal layer so a uniform electric field can be created.

The active layer of either or both the variable wavefront component and the phase compensation component can be a liquid crystal layer, which can be pre-aligned to first state with an applied electric field imposing a second state. For example, the index of refraction of the liquid crystal layer can change from state to state providing the localized phase compensation. In addition, analog control of the index between these two states can be achieved by varying the strength of the electric field. Phase shifts between zero and $2\pi$ can be used to maintain a continuous wavefront.

The preferred liquid crystals are birefringent crystals capable of rotating between two states having different indices of refraction, referred to as ordinary and extraordinary indices of refraction. To maximize the change in index between two states, the crystals rotate from the transmission, or z axis, to either of the orthogonal x or y axes. Alternatively, the liquid crystals can be oriented so the transmitted light sees an average of the two states. In the latter case, the component would be polarization insensitive at the cost of optical power (change of index). This can be compensated for by making the liquid crystal layer thicker, but response time of liquid crystal is generally proportional to the thickness of the liquid crystal layer, thus making the component slower.

If the device combining the variable wavefront component and the phase compensation component is polarization sensitive, then a stack of such devices can be used with their polarization states orthogonal to each other. In this way incoming light that passes unchanged through the first device is affected by the second device.

The devices can also function in reflection. With a reflective surface located adjacent to the phase compensation component the incoming light would double pass each component, enabling the liquid crystal layers to be half as thick and allowing the device to respond more quickly.

In reflection, phase compensation could also be accomplished by a series of adjustable mirrors. Linear translation of the micromirrors could be accomplished by piezoelectric or other known means.

Potential applications of this invention include, but are not limited to:

Variable lenses in microscopes, eyeglasses, cameras, rangefinders, target illuminators, telescopes, and optical communication systems, acoustic imaging systems, x-ray imaging systems, Near-eye displays, 3-D video displays, photocopiers, laser printers, measurement systems, interferometers, optical tweezers, holographic memories, optical storage media, optical information processing, multispectral imaging, Phased array antennae for x-rays, ultraviolet, visible, infrared, terahertz or microwave electromagnetic radiation, Optical tractor beams, Acoustic variable-focus lenses, and Acoustic phased arrays.

DETAILED DESCRIPTION OF THE INVENTION

Figure 1:
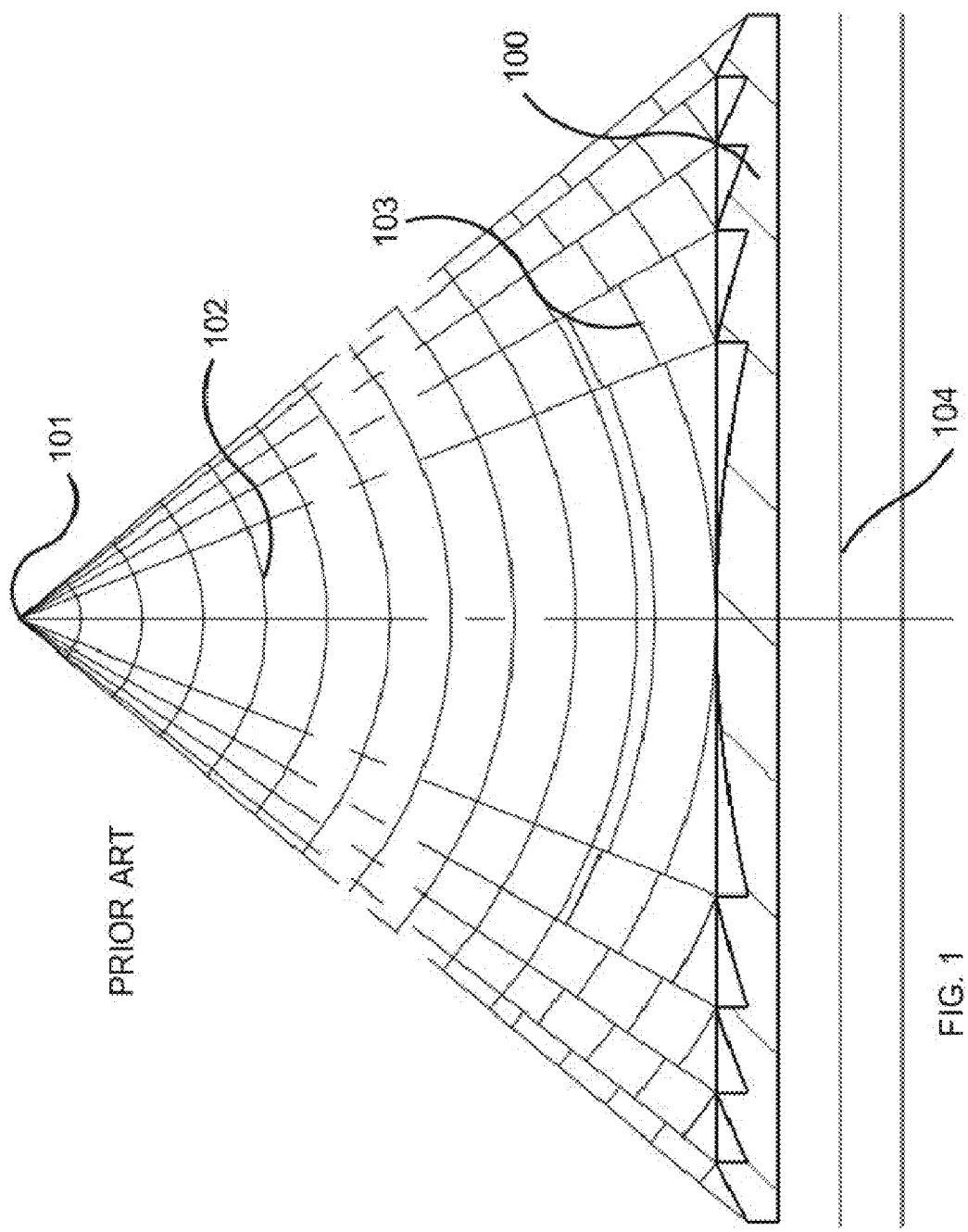
FIG. 1 illustrates a prior-art Fresnel lens cross section, producing a wavefront with phase discontinuities.
Figure 2:
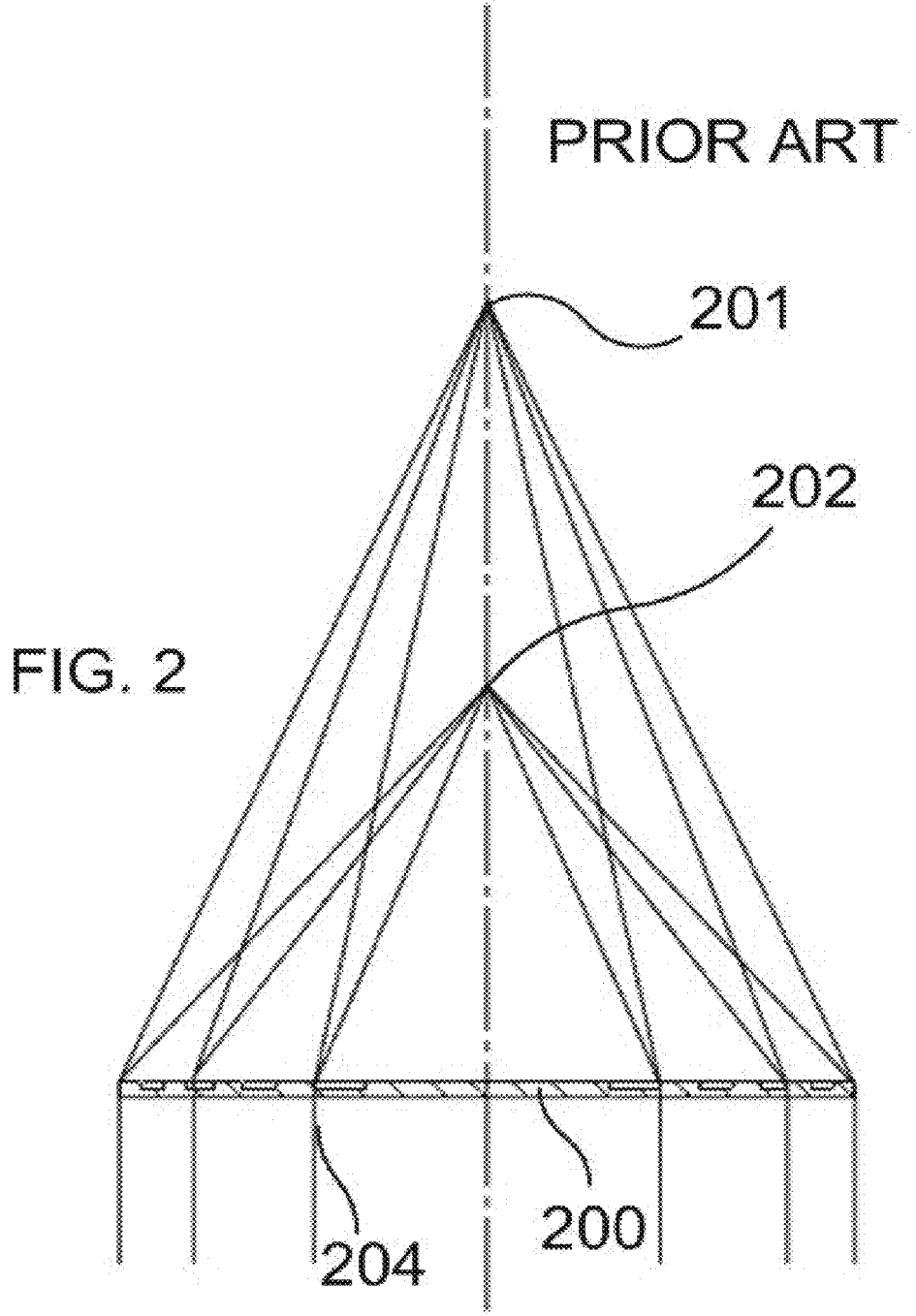
FIG. 2 illustrates a prior-art Fresnel zone plate producing a wavefront without phase discontinuities but with multiple diffraction orders.
Figure 3:
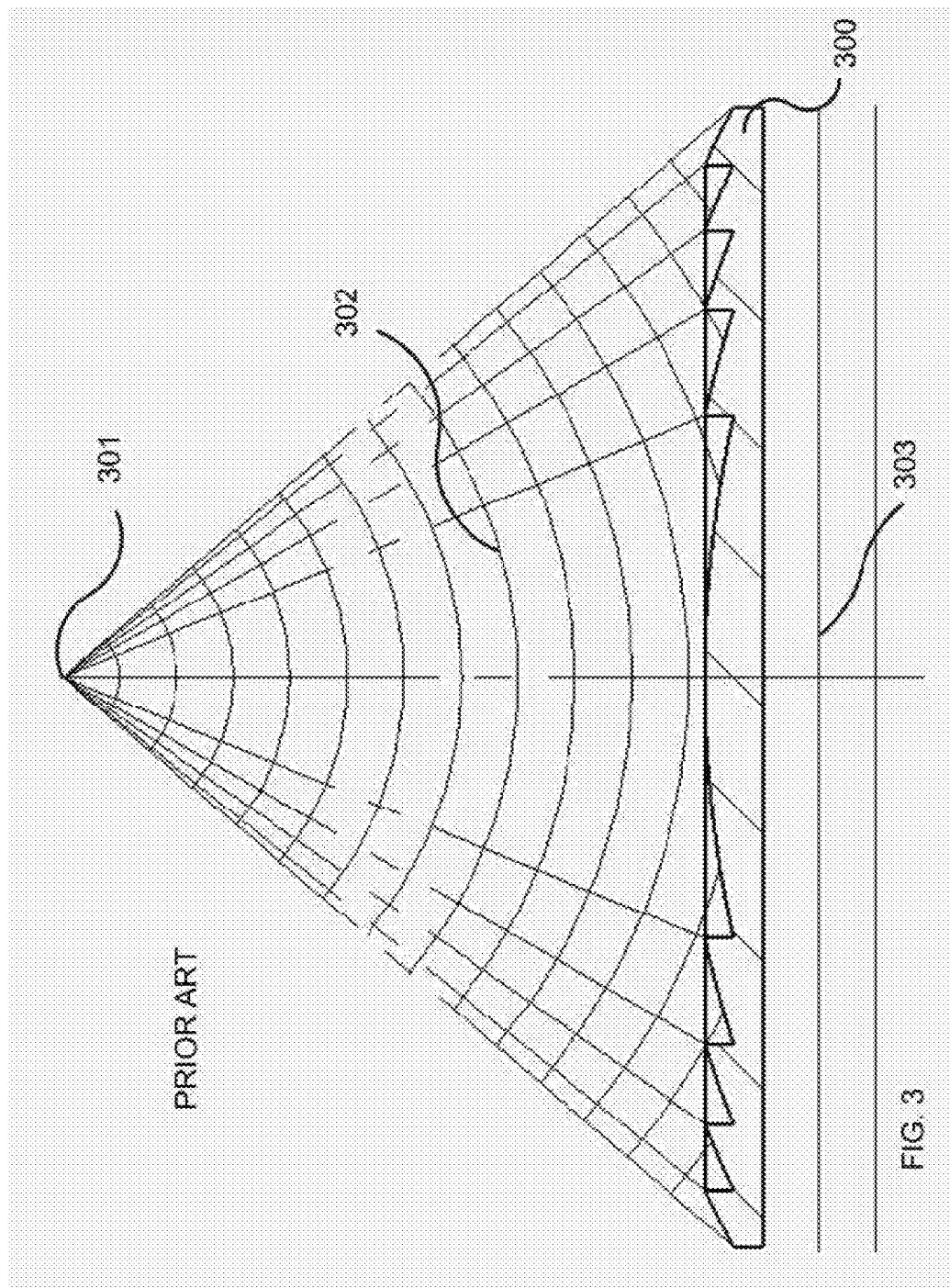
FIG. 3 illustrates a prior-art blazed Fresnel zone plate, producing a wavefront without phase discontinuities and with minimal intensity into extra diffraction orders.
Figure 4:
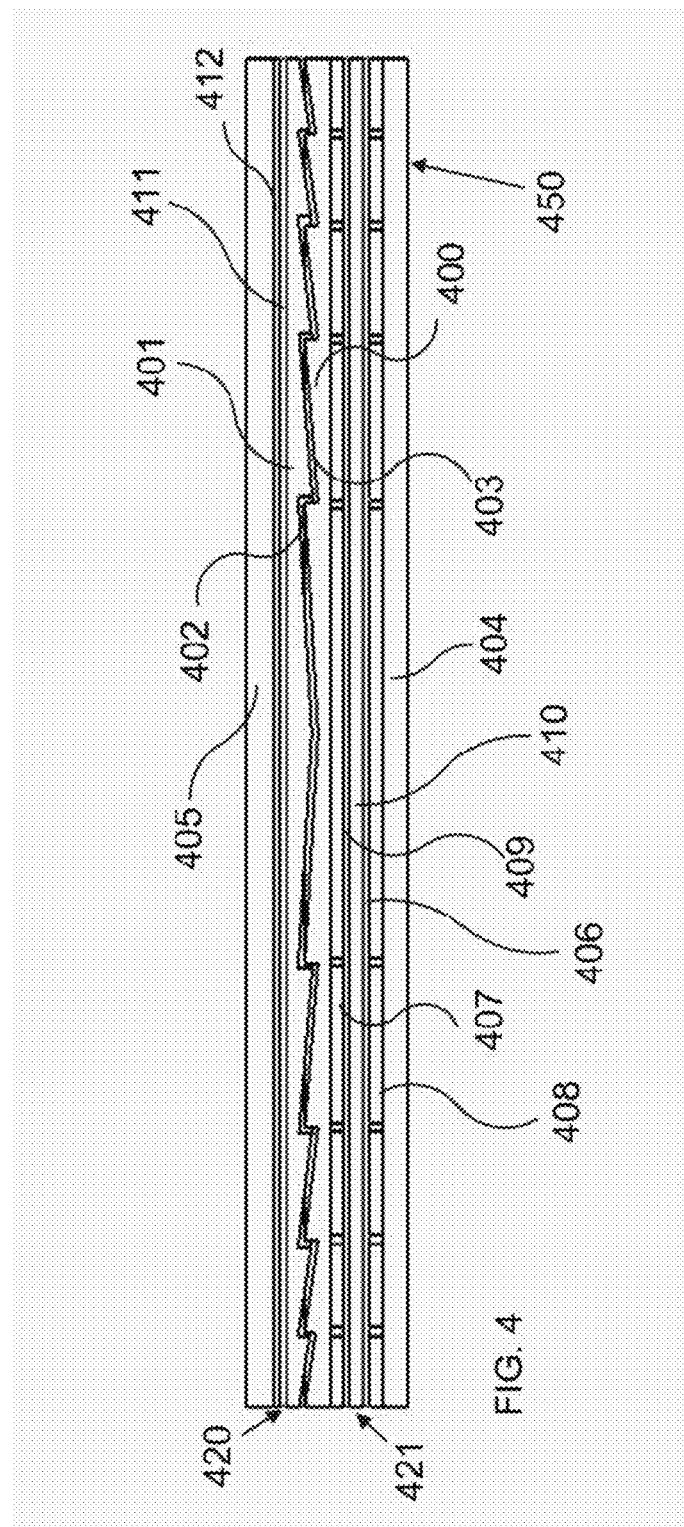
FIG. 4 illustrates an embodiment of the present invention incorporating a liquid crystal filled sawtooth structure analogous to a Fresnel lens and a variable phase plate, together behaving as a variable blazed Fresnel zone plate producing a wavefront without phase discontinuities and with minimal intensity into extra diffraction orders.

A device 450 illustrated by FIG. 4 as an embodiment of the invention includes two main components, a variable wavefront component 420 and a phase compensation component 421 stacked atop each other with the variable wavefront component 420 being in the form of a Fresnel lens. A liquid crystal layer 401 fills an alignment structure 400 formed of UV cured resin. Conductive ITO layers 412 and 403 can be powered at different voltages that cause a gradient electric field to be applied across the liquid crystal layer 401. If the ITO layer 403 were deposited beneath the alignment structure 400 then a uniform linear field can be applied across the liquid crystal layer 401.

Differing voltages applied to the ITO layers 403 and 412 cause an electric field to be present across the liquid crystal layer 401, which in turn causes the liquid crystals to rotate from their beginning state to a new state. For example, the beginning state can be a state in which an axis of symmetry of the liquid crystals is aligned with the direction of light propagation. Light propagating along this axis experiences a so-called ordinary index of refraction regardless of its polarization. Applying an electric field that causes the liquid crystals to rotate into a new state, where the axis of symmetry is normal to the axis of propagation, presents two different polarization-sensitive refractive indices in the direction of light propagation. One direction of linear polarization experiences the ordinary refractive index while an orthogonal direction of linear polarization experiences the extraordinary index of refraction, which can be lower or higher than the ordinary refractive index depending on the choice of liquid crystal.

The alignment structure 400 preferably has a refractive index matching either the ordinary or the extraordinary index of refraction so that the liquid crystal layer 401 only becomes effective as a Fresnel pattern in one or the other orthogonal orientations of the liquid crystal. In the embodiment of FIG. 4, the refractive index of the UV cured resin of the alignment structure 400 matches the ordinary refractive index of the liquid crystal. However, when the liquid crystal is rotated, propagating light having a given polarization would experience the extraordinary refractive of the liquid crystal, enabling the structure of the Fresnel lens pattern of the liquid crystal layer 401 to appear (i.e., refract differently than its surrounding medium).

A typical change in refractive index between ordinary and extraordinary orientations can be as great as 0.3. By varying the difference in voltages applied across the liquid crystal layer 401, the focus of the lens can be varied in analog fashion from its maximum optical power (determined by the refractive index difference of the liquid crystal, the shape of the UV cured resin layer 400, the thickness of the liquid crystal layer 401, and the size of the zones) to its minimum optical power where the lens pattern disappears and the lens has zero Diopters of power.

In either case, phase discontinuities can be generated between wavefront portions at the zone edges of the Fresnel pattern unless the phase compensation component 421 is used. The phase compensation component 421 is arranged in line with the variable wavefront component 220 with patterned ITO layers 407 and 408 allowing for each zone (aligned with the zones of the Fresnel pattern above) to be activated individually. By applying a voltage difference between the matching zone sections within layers 407 and 408, a uniform electric field can be applied across liquid crystal layer 410. This uniform field changes the orientation of the individual liquid crystals in much the same way as with the variable wavefront component 420, but here, there is no structure to the liquid crystal layer 410. The individual crystals are pre-aligned along one axis either through brushing or with alignment layers 406 and 409. A uniform change in index across a zone of the liquid crystal layer 410 does not change the direction or shape of the affected wavefront portion, but speeds it up or slows it down by as much a π phase shift, aligning the wavefront portion of that particular zone with the wavefront portions of one or both adjoining zones.

The phase compensation component 421 allows the device 450 to produce a continuous wavefront for any given wavelength. The required phase shifts can be calculated before hand and accessed through a look-up table, manually adjusted to maximize brightness at a single focus, and/or maintained by an active feedback.

The variable wavefront component 420 shapes the wavefront. An applied voltage creates an electric field across the layer 401 of liquid crystal material thus changing the orientation of the liquid crystal. The liquid crystal can be used to fill the structure 400, such as a Fresnel lens. In this instance, one orientation of the liquid crystals would index match the liquid crystals to the Fresnel structure 400. A different orientation of the liquid crystals would vary the index of refraction of the liquid crystal layer 401 relative to the Fresnel structure 400, thus causing the liquid crystal layer 401 to act as a Fresnel lens (or any other wavefront shaper). Uniform variations in the electric field could vary the orientation of the liquid crystals in an analog fashion between these two states, changing the focus of the lens.

Pre-alignment of the liquid crystals allows one of their alignment states to exist when there is no electric field present. The liquid crystals can be aligned so the component 420 is either on or off without an electric field present with the opposite being the case in the presence of an electric field.

The alignment layer 402 can be non-uniform. Anchoring energy can be used to pre-align the liquid crystals in a particular orientation. In this way a uniform electric field can be used to change the orientation of the non-uniformly arranged liquid crystals. The liquid crystal layer 401 can then act as a gradient index lens (GRIN) that changes its internal structure in the presence of an electric field. Pre-alignment of the liquid crystals, or applying a pre-tilt, can be used either in conjunction with a Fresnel structure 400 or in the place of a Fresnel structure.

The electric field applied across the liquid crystal layer 401 can be non-uniform. For example, a gradient electric field can be used to vary the orientations of the individual crystals, thus forming a gradient index change across the material. A gradient electric field can be formed by applying different voltages across a transmissive resistive material such as Indium Tin Oxide (ITO). Such a configuration would require each side of each electrode (407 and 408) to be individually addressable. Ultimately, any combination of physical structure, liquid crystal pre-tilt, or gradient electric field could be used to produce the variable wavefront component 420.

Figure 12:
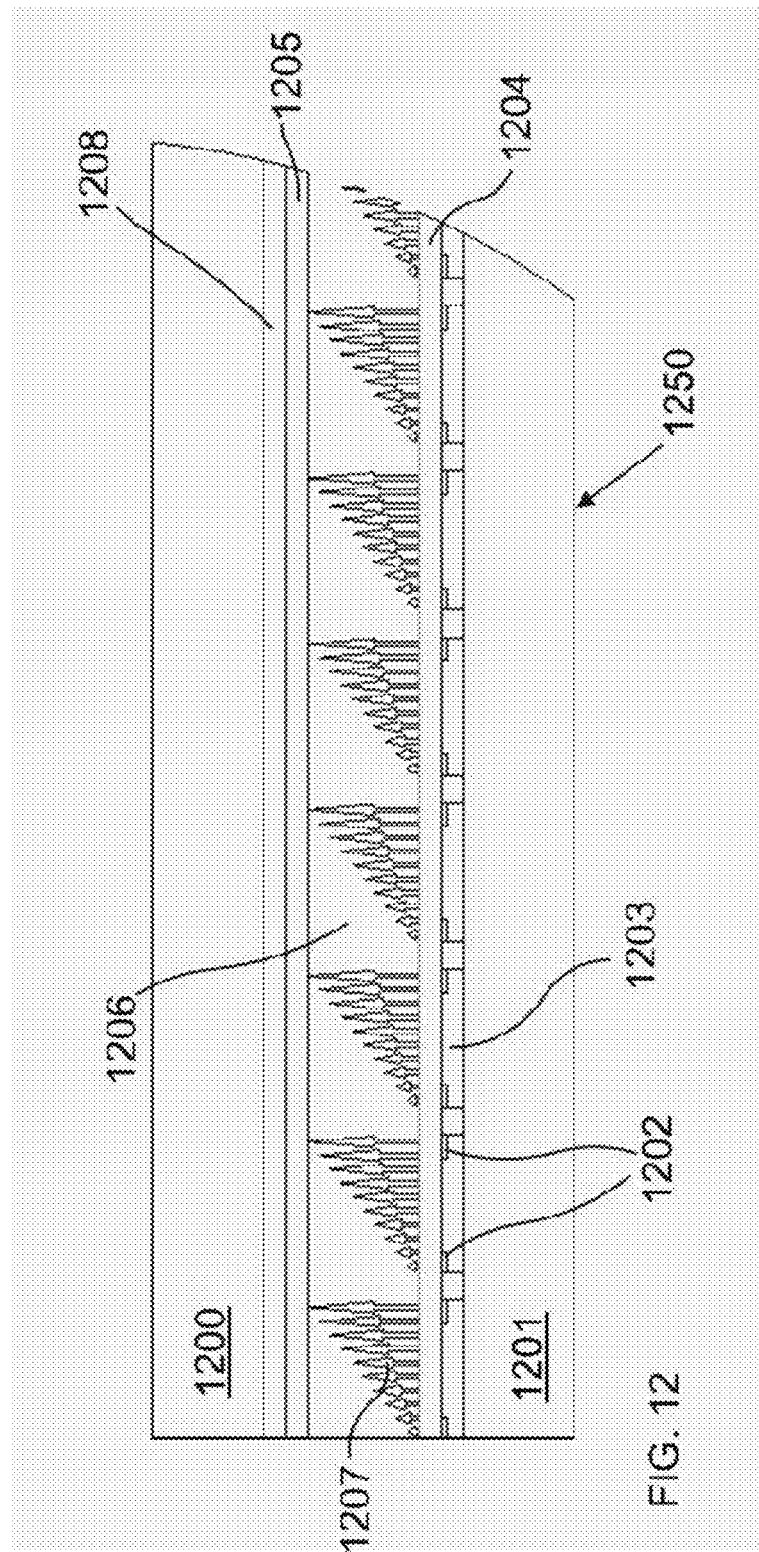
FIG. 12 illustrates a component incorporating a gradient electric field across liquid crystal material to produce gradient index prism-like features.

The device 450 uses the physical structure 400 to shape the liquid crystal in the variable wavefront component portion 420 of the device. FIG. 12 shows an alternative method of creating patterns within a liquid crystal layer 1206. Using transmissive resistive electrode strips or rings 1203 with strips 1202 on either side made of a highly conductive material like gold, gradient electric fields can be established across the liquid crystal layer 1206 with the transmissive conductive layer (ITO) 1208. For instance, if the conductive layer 1208 is kept at ground, the two strips 1202 can each have a different voltage applied to them This will produce a gradient electric field whose intensity is illustrated by 1207. This gradient field will cause the liquid crystals to rotate to varying degrees (proportional to the strength of the field) causing a gradient index change in the material.

As shown, there are gradient resistive electrodes 1203 below the liquid crystal layer 1206 and a common conductive electrode 1208 above. There could also be two layers of gradient resistive electrodes (requiring more connections) that would allow for finer control of the individual electrodes. With a common conductive plane, such as with the electrode 1208, it is still possible for there to be localized variations in the voltage due to nearby electrodes.

The liquid crystals can be pre-aligned using alignment layers 1204 and 1205 (or brushed) so that they begin in a first state without an applied field and rotate uniformly to a second state. The same trade-off exists as before with regard to polarization and maximum index change in the crystals. To maximize the index change, the crystals must be oriented along the same axis (orthogonal to the transmission) which causes the device to be polarization sensitive.

The combined shape of the electric fields 1207 is shown as a simple sawtooth or blazed pattern. This pattern could be changed by varying the electric fields. While the electric fields have a generally linear pattern across any one electrode, with small enough electrode strips or rings (maybe 20-25 microns wide), nearly any pattern can be approximated over a larger scale by using multiple electrodes.

Ultimately, the effect of using resistive electrodes 1203 to shape the electric fields and thus create a GRIN Fresnel lens (or any other arbitrary wavefront) would be generally equivalent to the use of a physical structure. The clear advantage, however, is that with this embodiment, no limitations are imposed on the wavefront shapes that can be constructed, particularly once the variable wavefront component is combined with the phase compensation component. The lens (if such a shape were desired) would be able to focus over a larger range than was possible in the embodiment of FIG. 4 because not only the index can be changed, but the effective shape of the equivalent lens facets can be changed as well.

Figure 13:
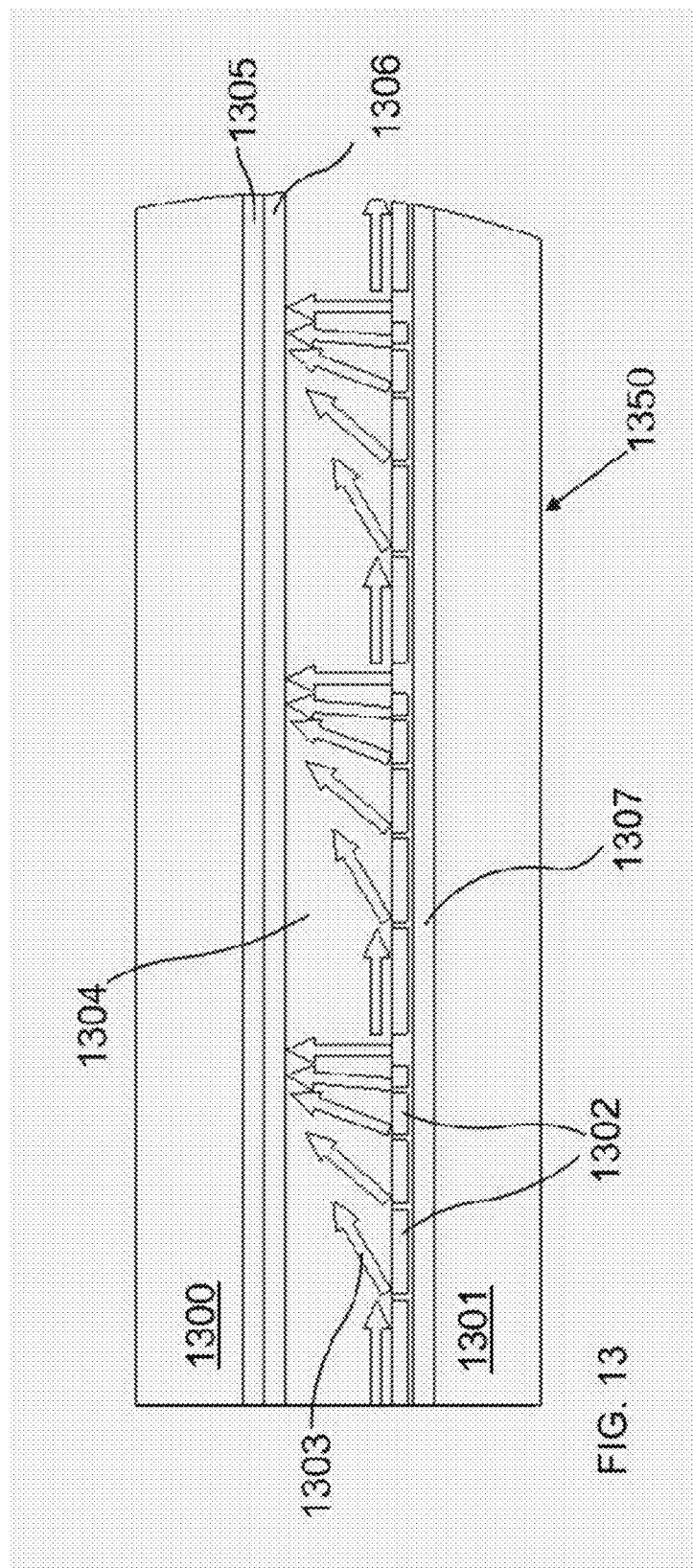
FIG. 13 illustrates the preferred design of a nanostructured pretilt alignment surface to make a single facet of an electrically variable Fresnel lens or Fresnel prism.

FIG. 13 shows only the variable wavefront component portion 1350 of the device, but in this embodiment, there is still another method of giving structures to a liquid crystal layer 1304. A close-up of an alignment layer 1302 shows the fine structure which creates an anchoring energy for the liquid crystal molecules. The arrows 1303 show the pre-tilt alignment of the liquid crystals closest to the alignment layer 1302. The same technique can be used at the top of the liquid crystal area with alignment layer 1306 anchoring the liquid crystals into a specific starting position.

Individual liquid crystals tend to align themselves with their neighbors, providing smooth vector gradient fields across the liquid crystal layer. When a uniform electric field is applied across the liquid crystal layer 1304 (by applying different voltages to ITO layers 1307 and 1305), the crystals are urged to align themselves with the electric field. In this case, there would be an effective structure within the liquid crystal layer 1304 (formed by the rotation of the liquid crystals as before) when there is no electric field present. Activating the field would urge the liquid crystals to align themselves with the field, removing the effective structure. In this case, the effective Fresnel lens (or other structure) would be active without an applied electric field and disappear when the field is applied.

As before, the electric field can be adjusted in an analog fashion thereby adjusting the force with which the liquid crystals are pulled from their pre-tilt alignment into alignment with the electric field. The pre-tilt forms an effective spring force that urges the liquid crystals to return to their original alignment. The applied electric field at least partially removes of the effective structure in the GRIN lens (or other arbitrary structure) causing a change in focus, for instance (in this case a reduction in optical power).

A clear advantage of the pre-tilt alignment method using anchoring energy is that the ITO layers used to generate the electric field do not need to be patterned into smaller electrodes. The voltage differential producing a uniform electric field can be applied uniformly across the entire liquid crystal area, reducing the need for complicated connections or driving schemes. Patent application US2011/0043717 describes alignment structures used to control pre-tilt of liquid crystal material and is hereby incorporated by reference.

Figure 5:
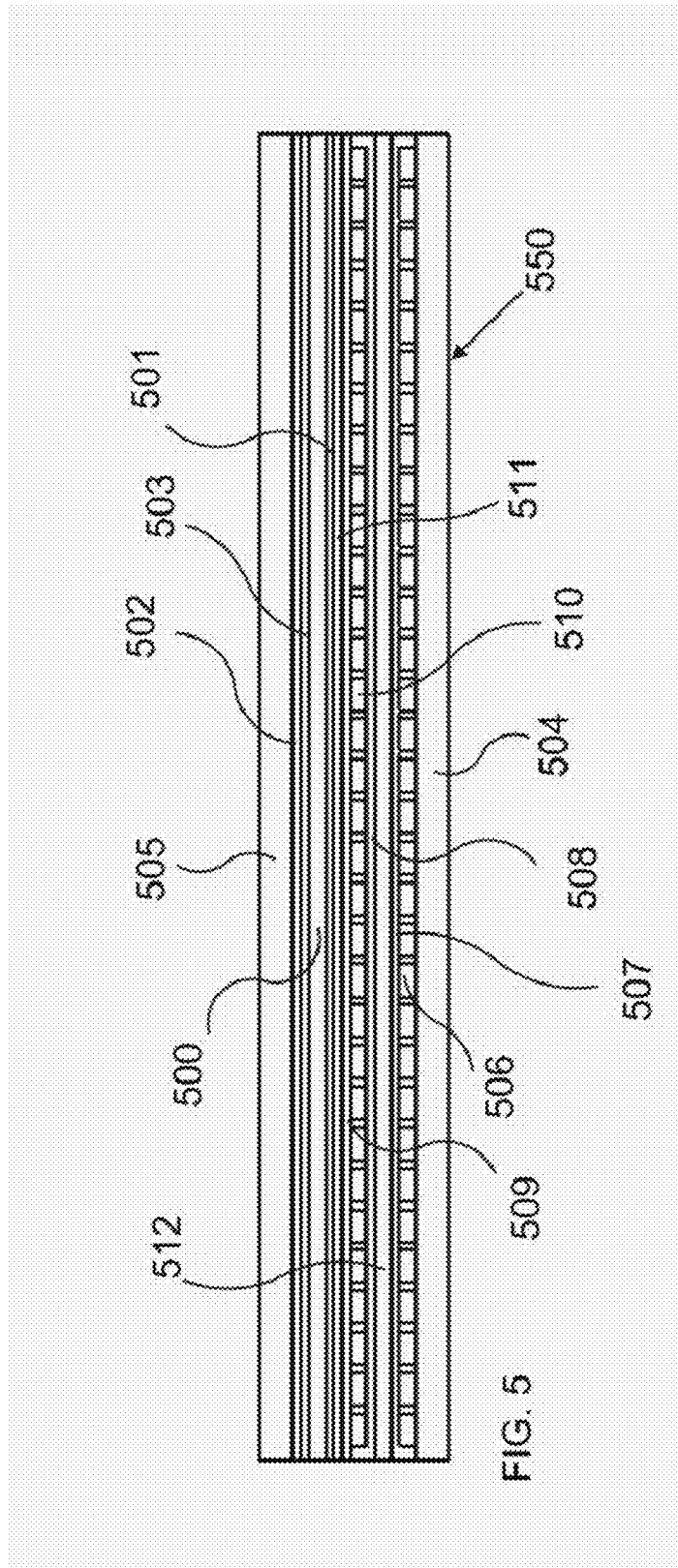
FIG. 5 illustrates the preferred embodiment of the invention.

FIG. 5 illustrates a device 550 as an embodiment of the invention that has a similar phase control component to that shown in FIG. 4 and a variable wavefront component similar to that shown in FIG. 13. An electrically variable Fresnel lens is formed by nanopatterned liquid crystal alignment structures 501 and 503. Pre-tilt angle varies approximately linearly across each Fresnel zone, such that the pretilt angle ranges from a low value to a high value, the way the height of a Fresnel lens zone varies from low to high. The effective refractive index of the liquid crystal layer 500 is controlled by the strength of an electric field across the liquid crystal layer 500, between electrodes 502 and 511. Accordingly, the focal length of the Fresnel lens is controlled by the voltage between electrodes 502 and 511. Suitable dimensions for the Fresnel lens zones are 25 microns in width.

Immediately below each zone of the formed Fresnel lens is a corresponding zone of phase control. For any selected wavelength, the relative phase delays between adjacent zones are adjusted to remove phase discontinuities in the outgoing wavefront. Selection of appropriate phase delays at each electrode pair chosen from individual electrode pairs 506 and 510 is well within the ability of skilled practitioners of optical instruments. It is also possible to select appropriate phase delays automatically by use of an optimization routine, such as a genetic algorithm, directed to minimize diffraction into undesired directions.

Layers 506 and 510 are shown as individual electrode strips or rings of patterned ITO. While this provides for finer control of each individual zone, either layer could be replaced with a single plane of ITO that would be maintained at a constant voltage, ground perhaps. This would make the number of control connections less while still allowing for individual control of each zone with the recognition that there would be greater potential for crosstalk between neighboring zones.

Figure 6:
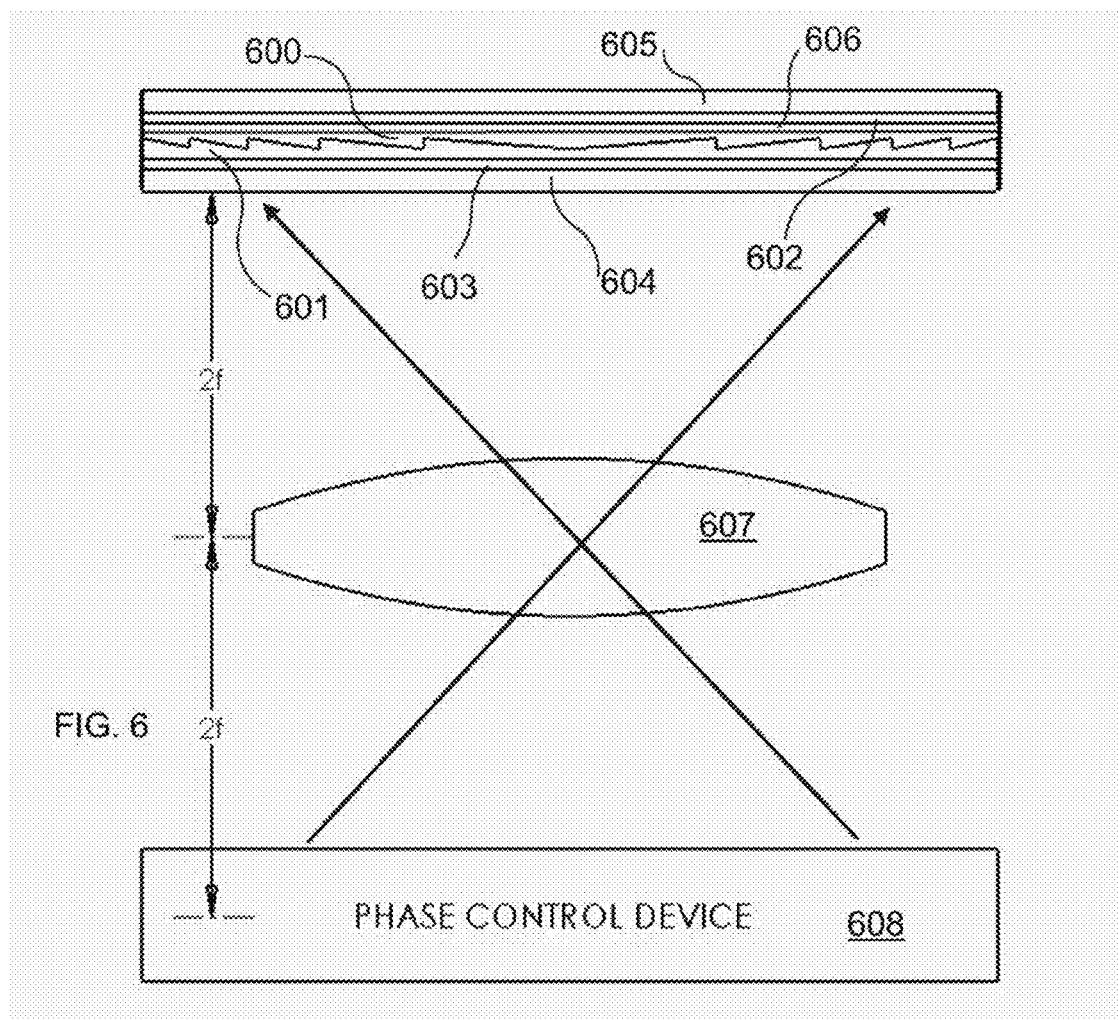
FIG. 6 illustrates a filled sawtooth structure, analogous to a Fresnel lens with a spatially separated phase control component.

An alternative embodiment shown in FIG. 6 employs sawtooth structures 601 like those of a standard Fresnel lens, filled with liquid crystal 600. The surfaces of the sawtooth structures 601 and the surface 604 of the cover plate 605 are treated, e.g., by exposure to polarized UV light, to align the liquid crystal in one azimuthal direction. Varying the voltage between a top electrode 602 and a bottom electrode 603 results in varying the vertical tilt of the liquid crystals, and therefore also results in varying the effective refractive index of the liquid crystal for light polarized along one axis defined by the liquid crystal azimuthal alignment. Accordingly, voltage between electrodes 602 and 603 can be used to control the focal length of the component. The precise width of each Fresnel zone is can be set as desired, but it is advantageous for the width to be between 5 and 50 microns for many applications, because wider Fresnel zones require thicker liquid crystal layers, and the switching or slewing time for liquid crystal is typically proportional to the square of the layer thickness.

Phase discontinuities can be removed by the same phase control component, directly below the Fresnel lens, as described for the embodiment of FIG. 5. Alternatively, phase discontinuities can be removed by the phase control component 608, which is imaged by a lens system 607 onto the liquid crystal layer 600 in the form of a Fresnel lens.

Figure 7:
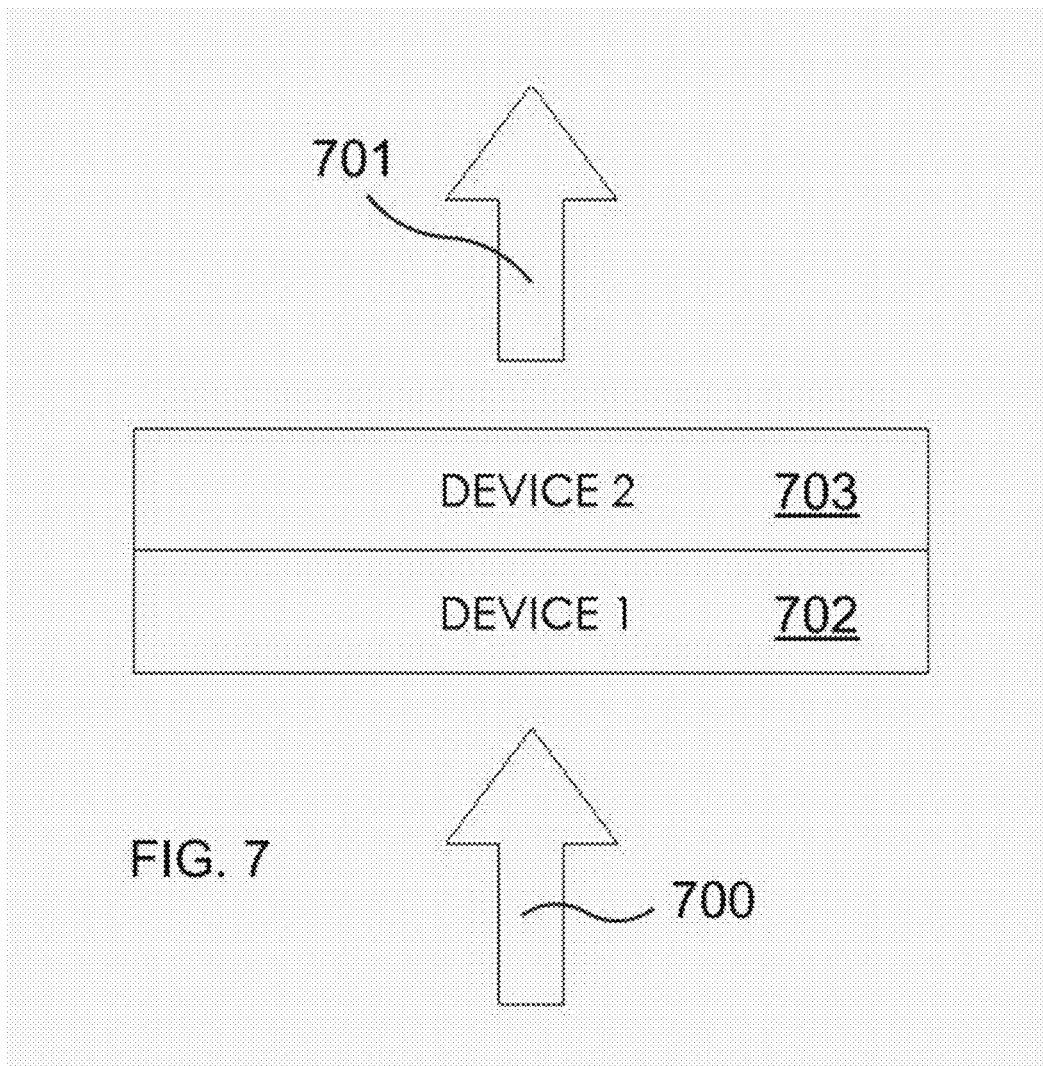
FIG. 7 illustrates a cascade of two devices, to provide independent control for two axes of polarization.

Devices such as those of FIG. 4 and FIG. 5 can be cascaded as shown in FIG. 7 to provide wavefront control independently for two axes of polarization.

Figure 8:
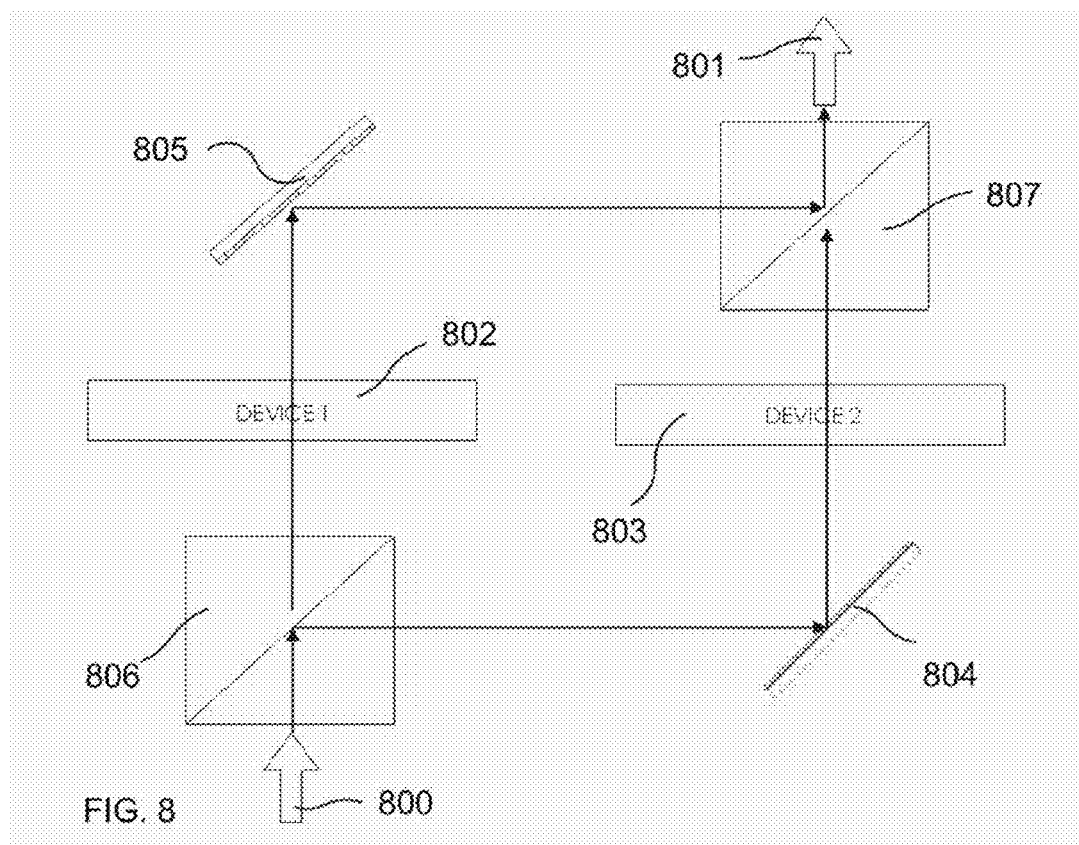
FIG. 8 illustrates a parallel combination of two devices, to provide independent control for two axes of polarization.

Devices such as those of FIG. 4 and FIG. 5 can be combined in parallel as shown in FIG. 8, to provide wavefront control independently for two axes of polarization.

Figure 9:
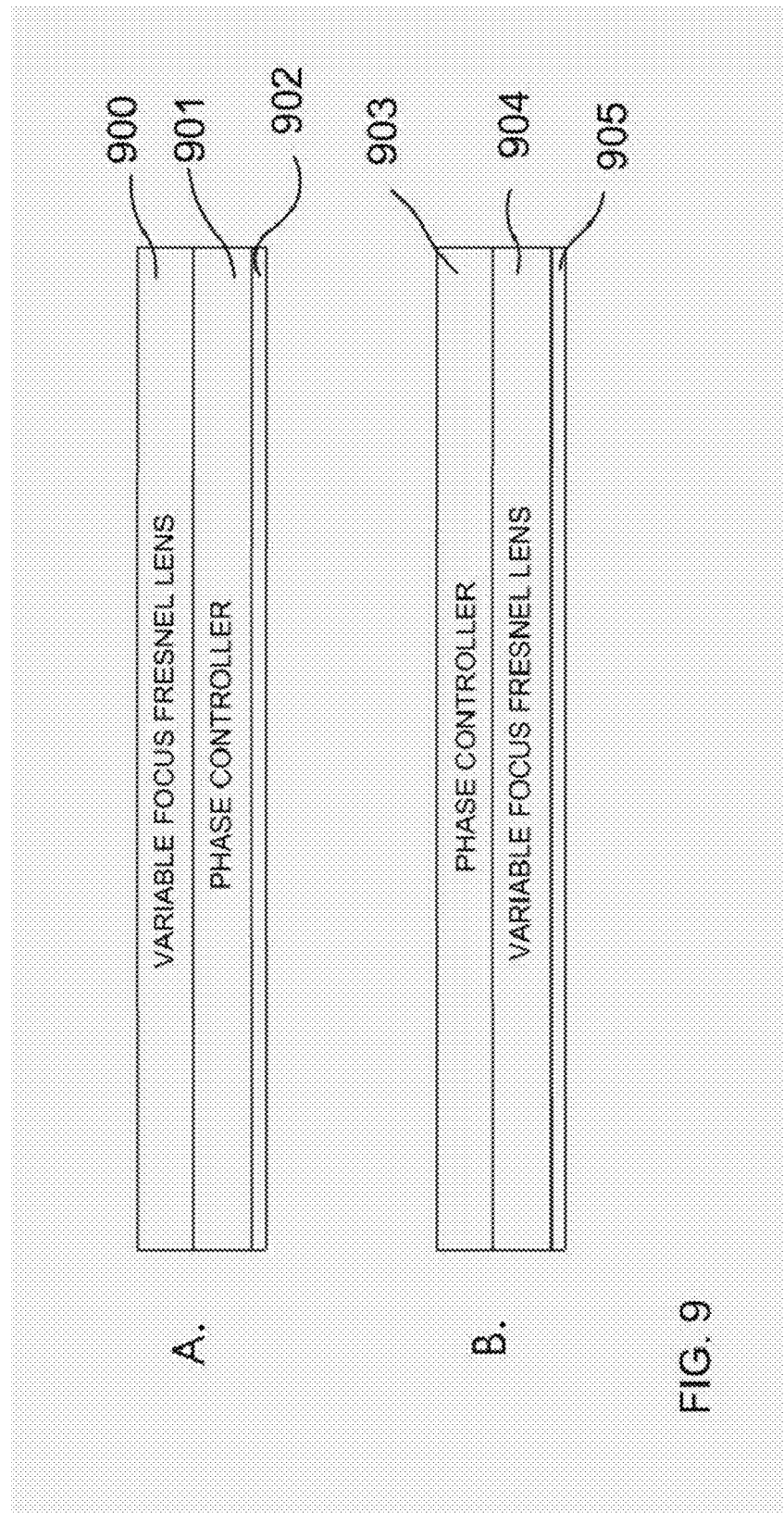
FIG. 9 illustrates a reflective embodiment, similar to the embodiments shown in either FIG. 4 or FIG. 5.

Devices such as those of FIG. 4 and FIG. 5 can be made reflective as indicated in FIG. 9, by adding a reflective surface 902 or 905. In this case, the effects of the Fresnel lens and the phase control component are doubled without increasing the thickness of their liquid crystal layers. Alternatively, the thicknesses of the liquid crystal layers can be reduced by fifty percent (relative to a transmissive device), resulting in a significant (e.g., four time) speed increase without loss of focusing range. Configurations A and B in FIG. 9 show that the phase compensation component 901 or 903 can be positioned either between the reflective surface 902 and the variable focus Fresnel lens (variable wavefront component) 900 or atop both the reflective layer 905 and the variable focus Fresnel lens 904.

The embodiments of FIGS. 4-9 can be used to control optical wavefronts. Wavefronts of any selected type can be controlled by using a directly analogous device in which the adjustable phase delays act on the selected type of wave. For example, acoustic wavefronts can be controlled by a similar device in which the active medium is a liquid or solid whose stiffness, and therefore whose acoustic propagation speed, depends on the strength of an electric field, magnetic field, or pressure field in the medium.

Figure 10:
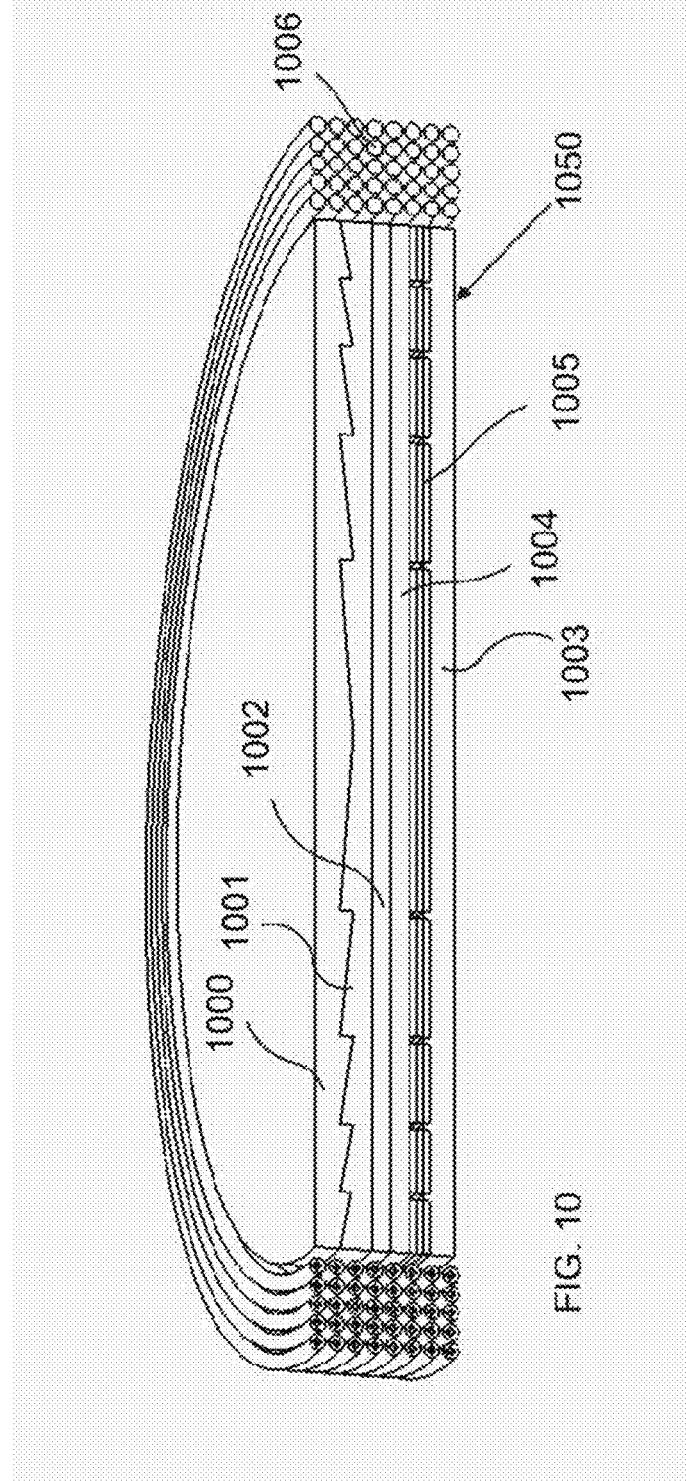
FIG. 10 illustrates an acoustic wavefront control device in accordance with the invention.

As shown in FIG. 10, a layer of ferrofluid 1001 fills a Fresnel lens 1000. The width of the Fresnel zones is on the order of 1 to 100 times the acoustic wavelength. A phase control component 1005 comprises an annular array of piezoelectrically driven zones, immersed in nonmagnetic liquid 1004, with a vertical range corresponding to something more than one-half wavelength of the acoustic wave. An electromagnet 1006 can be used to adjust the magnetic field across the ferrofluid, thereby controlling the refractive index of the ferrofluid.

Any array of wavefront-directing elements can be combined with any corresponding array of phase-correcting elements and used as a variable lens or phased array. For example, a random array of wavefront-directing elements can be combined with a similarly arranged array of phase-correcting elements. The wavefront-directing elements can be, for example, variable-tilt micromirrors, variable-index liquid crystal filled prisms, rotatable diffraction gratings, tiltable diffraction gratings, or variable pitch diffraction gratings.

Phase-correcting elements can be deflectable membranes, piezoelectrically driven mirrors, translatable gratings, variable-index liquid crystal layers, electro-optical material layers, magneto-optical layers, acousto-optical device, and in general any structure that can controllably alter the phase of transmitted or reflected light. In addition to the structures mentioned above, an "HPDLC" structure (holographic polymer dispersed liquid crystal structure) can be used.

Suitable electro-optical media include ferroelectric liquid crystals, nematic liquid crystals, electrowetting media, grating light valves, magneto-optical media, Faraday rotation media, photorefractive media, and PZLT.

Figure 14:
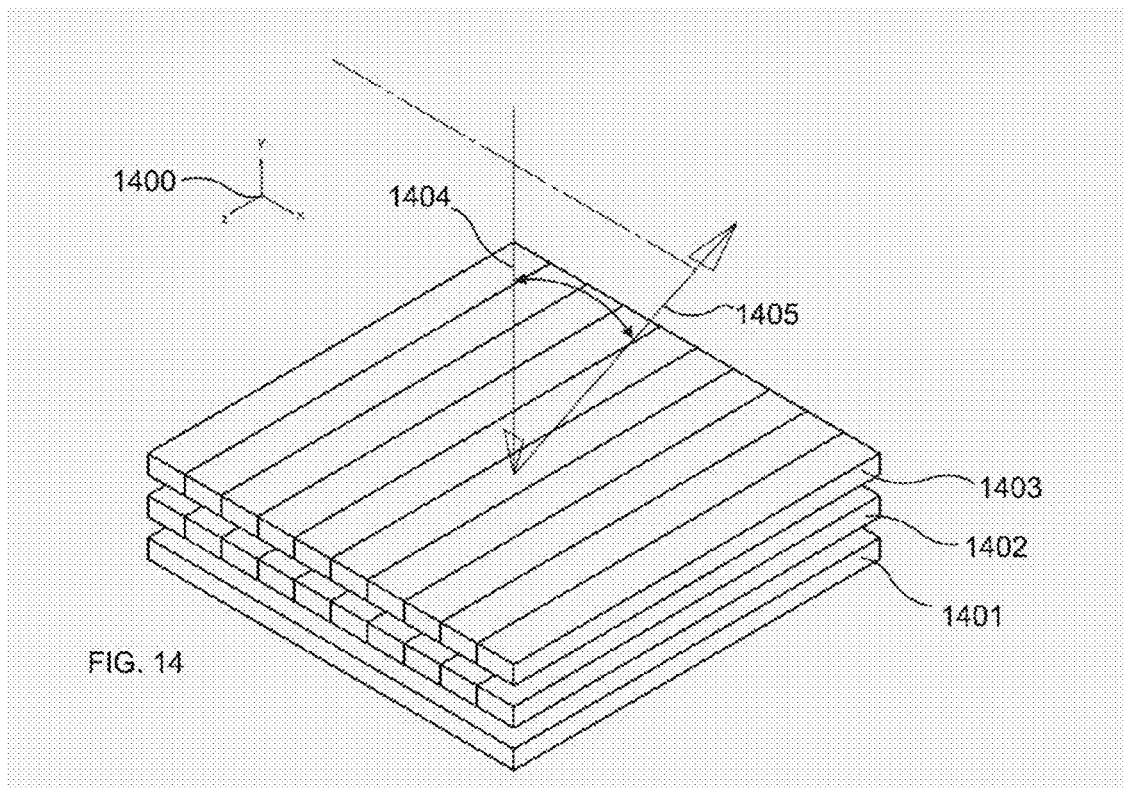
FIG. 14 illustrates a reflective linear beam steering device.

Alternatively, an embodiment of the invention can be arranged as a one-dimensional beam steerer as illustrated in FIG. 14. In this case, the zones are defined by straight-line electrodes so it performs as a Fresnel prism. This is a reflective embodiment of the device that could as easily be transmissive.

Figure 11:
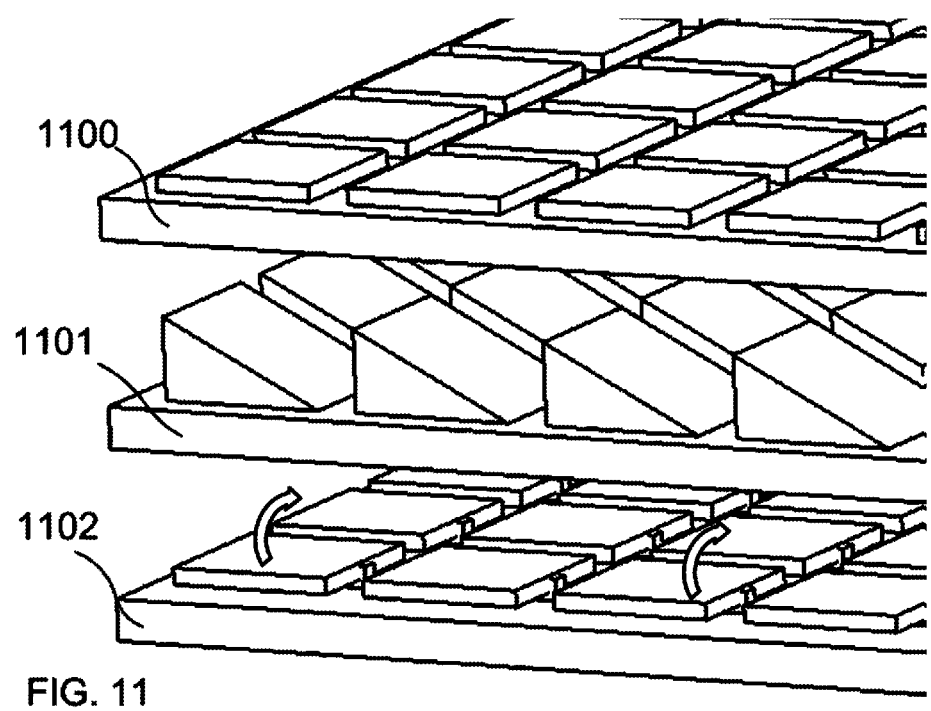
FIG. 11 illustrates a 2-dimensional phased array made according to the present invention.

The device in FIG. 11 can impose an arbitrary spatial modulation of phase onto a wavefront passing through it, and can therefore be used as a highly efficient, high-speed adaptive optical element. The wavefront passes through the phase compensation component 1100 first, then passes through a prism array area 1101, and finally is reflected back by an array of micromirrors (e.g., microelectromechanical systems or MEMS) positioned on the lowest layer 1102.

The prism array 1101 allows for deflection of the wavefront along one axis while the mirror array 1102 allows for deflection in the orthogonal direction. Phase compensation is only done once in this instance. Layer 1101 is pictured as an array of physical prisms, but they could be fabricated out of any of the above methods, including a transmissive gradient electrode stack across a layer of liquid crystal, a physical transparent structure filled with liquid crystal and ITO layers on either side, and alignment layers using anchoring energy to create a pre-tilt to the liquid crystal layer sandwiched between ITO layer.

Figure 15:
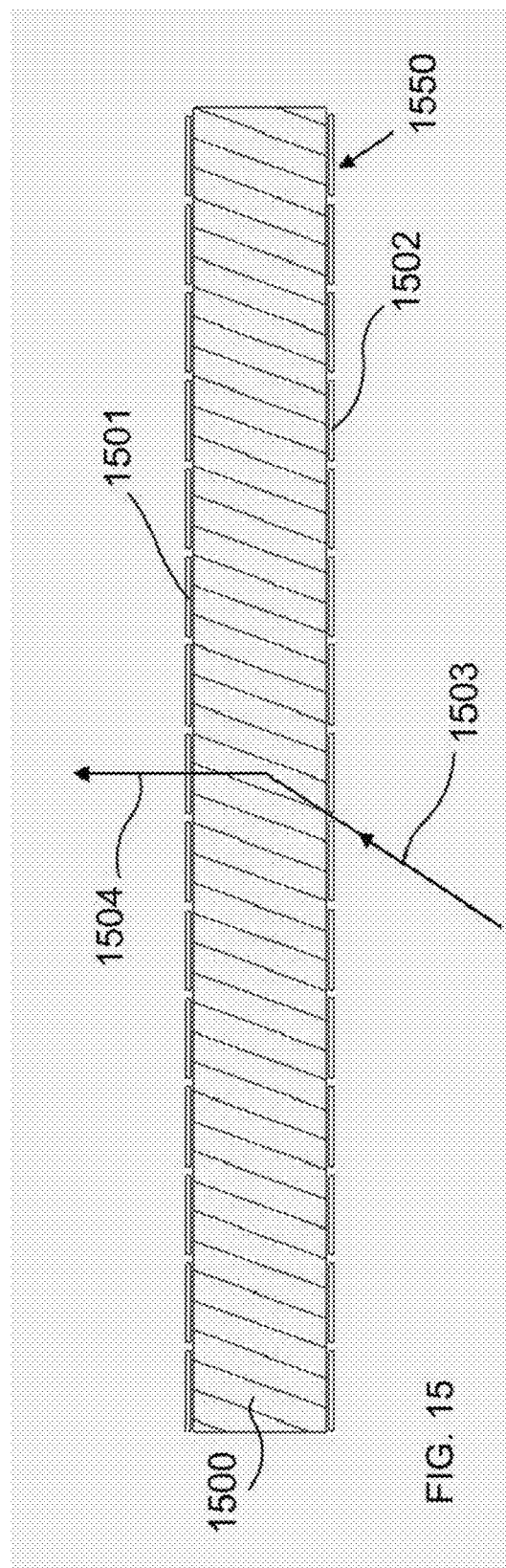
FIG. 15 illustrates a holographic polymer dispersed liquid crystal implementation in accordance with the invention.

In another alternative embodiment shown in FIG. 15, beam steering is performed by a Holographic Polymer Dispersed Liquid Crystal device (HPDLC) with appropriately configured transparent gradient electrodes. An HPDLC can act as a two-state diffractive light switch. In a first state, an HPDLC transmits light without diffraction. In a second state an HPDLC can diffract light. The first state usually corresponds to zero voltage difference between a top electrode 1501 and a bottom electrode 1502. The second state usually corresponds to a voltage difference greater than some threshold voltage Vt. However, it is also possible to vary the voltage difference in a continuous fashion. This has two consequences. First, it varies diffraction efficiency of the device. Second, it varies the effective bulk refractive index of the HPDLC diffractive layer.

As in the previously described embodiments, the phase delay can be adjusted (with the use of a phase compensation component not pictured) at each element to control the phase relationships between adjacent elements in order to produce a diffraction-limited beam steering or lens behavior. An important feature of HPDLC as used in this device is its very high speed.

The various embodiments of the invention can be used in a wide range of applications including adaptive optics, beam steering, eyeglasses, optical computing, optical tweezers, and image motion compensation. For example, various embodiments can be used to provide eyeglasses whose correction parameters are programmable and adjustable, or to provide a lens whose focal point can be electronically moved in any coordinate direction (X, Y, and Z) or whose focal length with respect to the X and Y directions can be controlled independently. By continuously moving its focal point in a fixed Z plane, the device serves as a traveling lens and can be used as an image scanner or as an image writer.

The invention claimed is:

1. A variable wavefront controlling device comprising:
   a variable wavefront component and a variable phase compensation component,
   the variable wavefront component including a two-dimensional array of individually variable wavefront deflection elements that are each arranged to encounter a different portion of a wavefront and to deflect the different portions of the wavefront along a first axis resulting in phase discontinuities between adjacent portions of the wavefront,
   the variable phase compensation component including a two-dimensional array of individually variable phase delay elements that are respectively arranged to encounter the different portions of the wavefront deflected by the variable wavefront deflection elements and to minimize the phase discontinuities between the adjacent portions of the wavefront.

2. The variable wavefront controlling device of claim 1 in which the two-dimensional array of individually variable wavefront deflection elements is a first two-dimensional array of individually variable wavefront deflection elements, and the variable wavefront component also includes a second two-dimensional array of individually variable wavefront deflection elements that are arranged for deflecting the different portions of the wavefront along a second orthogonally related axis.

3. The variable wavefront controlling device of claim 2 in which the first two-dimensional array of individually variable wavefront deflection elements includes an electrode stack across a physical transparent structure and the physical transparent structure of the first two-dimensional array of individually variable wavefront deflecting elements is filled with a layer of liquid crystal.

4. The variable wavefront controlling device of claim 3 in which the physical transparent structure includes an alignment layer that use anchoring energy to create a pre-tilt to the liquid crystal layer.

5. The variable wavefront controlling device of claim 2 in which the second two-dimensional array of individually variable wavefront deflecting elements includes a two-dimensional array of reflectors that are individually tiltable for deflecting the different portions of the wavefront along the second orthogonal axis by reflection.

6. The variable wavefront controlling device of claim 2 in which the first two-dimensional array of individually variable wavefront deflecting elements and the two-dimensional array of individually variable phase delay elements are arranged in relation to the second two-dimensional array of individually variable wavefront deflecting elements so as to encounter the wavefront en route both to and from the second two-dimensional array of individually variable wavefront deflecting elements.

7. The variable wavefront controlling device of claim 2 in which the individually variable wavefront deflecting elements of both the first and second two-dimensional arrays of individually variable wavefront deflecting elements have optical properties that are individually variable by a controlling influence.

8. The variable wavefront controlling device of claim 7 in which the individually variable wavefront deflecting elements of the first two-dimensional array of individually variable wavefront deflecting elements include individually addressable electrodes and electro-optical media responsive to different electric field strengths imparted by the individually addressable electrodes.

9. The variable wavefront controlling device of claim 8 in which the individually addressable electrodes impart gradient electric fields across the electro-optical media to adjust the relative direction or shape at which the different portions of the wavefront are propagated.

10. The variable wavefront controlling device of claim 7 in which the individually variable wavefront deflecting elements of the first two-dimensional array of variable wavefront deflecting elements include an electro-optical media comprising liquid crystals that are variably pre-tilted within the variable wavefront deflecting elements and subject to realignments by the presence of one or more electric fields.

11. The variable wavefront controlling device of claim 2 in which each of the individually variable wavefront deflecting elements of the first and second two-dimensional arrays of individually variable wavefront deflecting elements is optically aligned with one of the individually variable phase delay elements of the two-dimensional array of individually variable phase delay elements to compensate for phase discontinuities between the different portions of the wavefront that are individually deflected by the individually variable wavefront deflecting elements of the first and second two-dimensional arrays of variable elements.

12. The variable wavefront controlling device of claim 2 in which the individually variable wavefront deflecting elements of at least one of the first and second two-dimensional arrays of individually variable wavefront deflecting elements include at least one of variable-tilt micromirrors, variable-index liquid crystal filled prisms, rotatable diffraction gratings, tiltable diffraction gratings, and variable pitch diffraction gratings.

13. The variable wavefront controlling device of claim 1 in which the individually variable phase delay elements include at least one of deflectable membranes, piezoelectrically driven mirrors, translatable gratings, variable-index liquid crystal layers, electro-optical material layers, magneto-optical layers, and acousto-optical devices.

14. The variable wavefront controlling device of claim 1 in which the individually variable phase delay elements include electro-optical material layers and the electro-optical material layers include at least one of ferroelectric liquid crystals, nematic liquid crystals, electrowetting media, grating light valves, magneto-optical media, Faraday rotation media, photorefractive media, and PZLT.

15. The variable wavefront controlling device of claim 1 in which the variable wavefront component and the variable phase compensation component are arranged to impose an arbitrary spatial modulation onto the wavefront.

16. The variable wavefront controlling device of claim 1 in which the individually variable wavefront deflecting elements of the second two-dimensional array of individually variable wavefront deflecting elements include reflective surfaces so that the wavefront propagates more than once through the first two-dimensional array of individually variable wavefront deflecting elements.

17. The variable wavefront controlling device of claim 1 in which the variable phase compensation component is imaged onto the variable wavefront component.

18. The variable wavefront controlling device of claim 2 in which the second two-dimensional array of individually variable wavefront deflecting elements includes a two-dimensional array of micromirrors.

19. The variable wavefront controlling device of claim 2 in which the first two-dimensional array of individually variable wavefront deflecting elements includes an array of prisms between electrodes.

20. The variable wavefront controlling device of claim 2 in which the second two-dimensional array of individually variable wavefront deflecting elements includes a two-dimensional array of micromirrors and the first two-dimensional array of individually variable wavefront deflecting elements includes an array of prisms between electrodes.

21. The variable wavefront controlling device of claim 2 in which the individually variable wavefront deflecting elements of at least one of the first and second two-dimensional arrays are arranged in a plurality of linear strips.

22. The variable wavefront controlling device of claim 21 in which the individually variable phase delay elements include electro-optical material layers arranged in a plurality of linear strips.

23. The variable wavefront controlling device of claim 10 in which the variably pre-tilted liquid crystals are anchored to alignment layers that vary the tilt of the liquid crystals within the individually variable wavefront deflecting elements of the first two-dimensional array of individually variable wavefront deflecting elements.

* * * * *